Dec. 16, 1930.    L. JOHNSON    1,785,310
ARTIFICIAL FISH LURE
Filed April 3, 1930
Fig. 1.
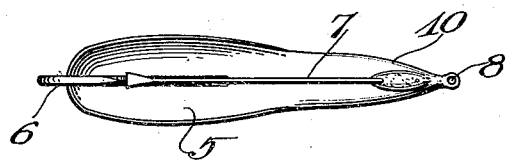
Fig. 2.
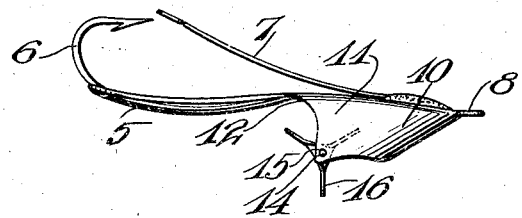
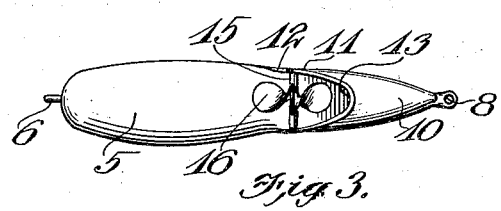
Fig. 3.
Inventor:
Louis Johnson Patented Dec. 16, 1930

1,785,310

UNITED STATES PATENT OFFICE

LOUIS JOHNSON, OF CHICAGO, ILLINOIS

ARTIFICIAL FISH LURE

Application filed April 3, 1930. Serial No. 441,345.

My invention relates to artificial fish lures of the spoon variety and is designed more as an improvement over the device covered by my Patent No. 1,466,231, dated August 28, 1923.

The main object of the improvement is to extend the structure with a skirt portion simulating the head of a fish and the gills thereof in action whereby to render the lure more deceiving.

A further improvement is to extend the lure structure conically from a frontal point to produce the skirt mentioned before, thus reducing the resistance of the lure as it travels through the water.

A still further object of the improvement is to encase in the skirt portion of the lure a paddle wheel whose action as the lure is drawn through the water simulates that of the gills of a fish in motion.

Another object of the improvement is to so mount the paddle wheel in the skirt portion of the lure as to afford the same the protection of a housing against interference by weeds, yet render the action of the paddle wheel prominently apparent.

An additional object of the improvement is to so dispose the paddle wheel in the skirt extension as to place only one paddle in exposed position during the rotation thereof, such position being favorable to the clearance of weeds with which the paddle may come in contact.

A final but nevertheless important object of the invention is to construct the novel lure on lines of extreme simplicity and life time durability.

With the above objects in view and any others that may suggest themselves from the specification and claims to follow, a better understanding of the improvement may be had by reference to the accompanying drawing, in which—

Figure 1 is a plan view of the novel fish lure;

Fig. 2 is an elevation thereof; and

Fig. 3 is a bottom view thereof.

Referring specifically to the drawing, it will be seen that fundamentally, the improved lure follows the line of my patented structure where the spoon 5, hook 6, guard 7, and eye 8 are concerned, except that in the improvement the metal of the spoon 5 is extended to serve at its forward end and in a horizontal plane as the eye.

For the purpose of the improvement, the metal of the spoon is extended conoidally back of the eye 8 in simulation of the head of a fish, as indicated at 10, this structure being hollow and terminating with laterally-spaced skirt portions 11 whose rear edges rise curvedly to meet the sides of the spoon, as indicated at 12. The bottoms of the skirt portions 11 combine with the bottom edge of the conoidal structure to form an opening 13.

The rear bottom corners of the skirt portions are perforated in horizontal registration, as indicated at 14, to provide a bearing for a spindle 15 disposed between the skirt portions. This spindle is built with a paddle wheel of propeller design, the blades 16 of the paddle wheel being in planes transverse of the traveling course of the lure.

When the novel lure is drawn through the water, its spoon 5 keeps it balanced, and induces a wiggling motion. The conoidal front 10 by its weight maintains the lure in a position to present its hook 6 in an upward direction, and by its form reduces the resistance of the lure as it travels through the water and enables it to climb over and displace weeds. While the lure is in motion, the paddle wheel is caused to rotate by the current of the water, simulating the action of the gills of a fish while in motion. The conoidal front and skirt portions 11 protect the paddle wheel from being caught in weeds as the lure intercepts them, only one blade of the paddle wheel issuing from the opening 13 during the rotation thereof. However, the motion of the exposed blade is rearward, so that whatever it may intercept in the nature of weeds it will carry back and leave as the lure proceeds on its way. Thus, the novel lure, in addition to having the customarily desirable qualities of an article of this kind, has the additional features of an animated element which is protected from weeds.

In conclusion, it will be seen that the improved lure, by being mainly extended from the rigid metal of the spoon, constitutes a firm and durable article. It is extremely simple, since its extension is made in but one piece which is integral with the spoon, the only part added being the paddle wheel. It may therefore be appreciated that the novel lure may be manufactured at small expense and yet furnish all the desirable qualities sought in an article of this kind.

I claim:—

1. An artificial fish lure comprising a plate pointed at its forward end and curved laterally to form a conoidal body from the point wholly beneath the plane of the top surface of the plate.

2. The structure of claim 1, and an eye extended from the point to serve as a line attaching means.

3. An artificial fish lure comprising a plate pointed at its forward end and with its sides curved and closed to form a hollow cone from the point.

4. An artificial fish lure comprising a plate pointed at its forward end and curved laterally to form a conoidal body from the point, the sides of said body resembling the head of a fish and the rear edges of said sides being transverse of the plate and curved to meet the side edges of the latter.

5. An artificial fish lure comprising a plate pointed at its forward end and curved laterally to form a hollow conoidal body from the point, the sides of said body being in substantial parallelism at the rear, and a paddle wheel mounted between the sides and freely rotatable.

6. An artificial fish lure comprising a plate pointed at its forward end and curved laterally to form a hollow conoidal body from the point, the rear portion of the body having a bottom opening, sides extended rearwardly from the body adjacent the opening and terminating with bottom corners, a spindle transversely disposed between the corners and freely rotatable, and a paddle wheel carried by the spindle.

7. The structure of claim 6, the paddle wheel being at a height to dispose but one of its paddles at a time externally of the plane of said bottom opening.

8. An artificial fish lure comprising an elongated plate, pendent skirt portions from the sides of the latter, and a paddle wheel mounted between said sides for free rotation in a plane substantially parallel to them.

9. An artificial fish lure comprising a plate-like body, a hook at the top surface of the plate and a conoidal projection at the bottom of said plate and having its apex extending toward the forward end thereof.

10. A fish lure comprising a plate-like body, a hook at the top surface of the plate, stabilizing means at the bottom of the plate, and a rotatable fluid actuated element mounted in said stabilizing means.

11. A fish lure comprising a plate-like body, a hook at the top surface of the plate, stabilizing means at the bottom of the plate, and a rotatable fluid actuated paddle-wheel mounted in said stabilizing means.

In testimony whereof I affix my signature.

LOUIS JOHNSON.